3,332,863
ELECTROMACHINING METHOD AND APPARATUS UTILIZING A CONTROL FOR SENSING CURRENT DIFFERENTIALS BETWEEN ELECTRODE SEGMENTS

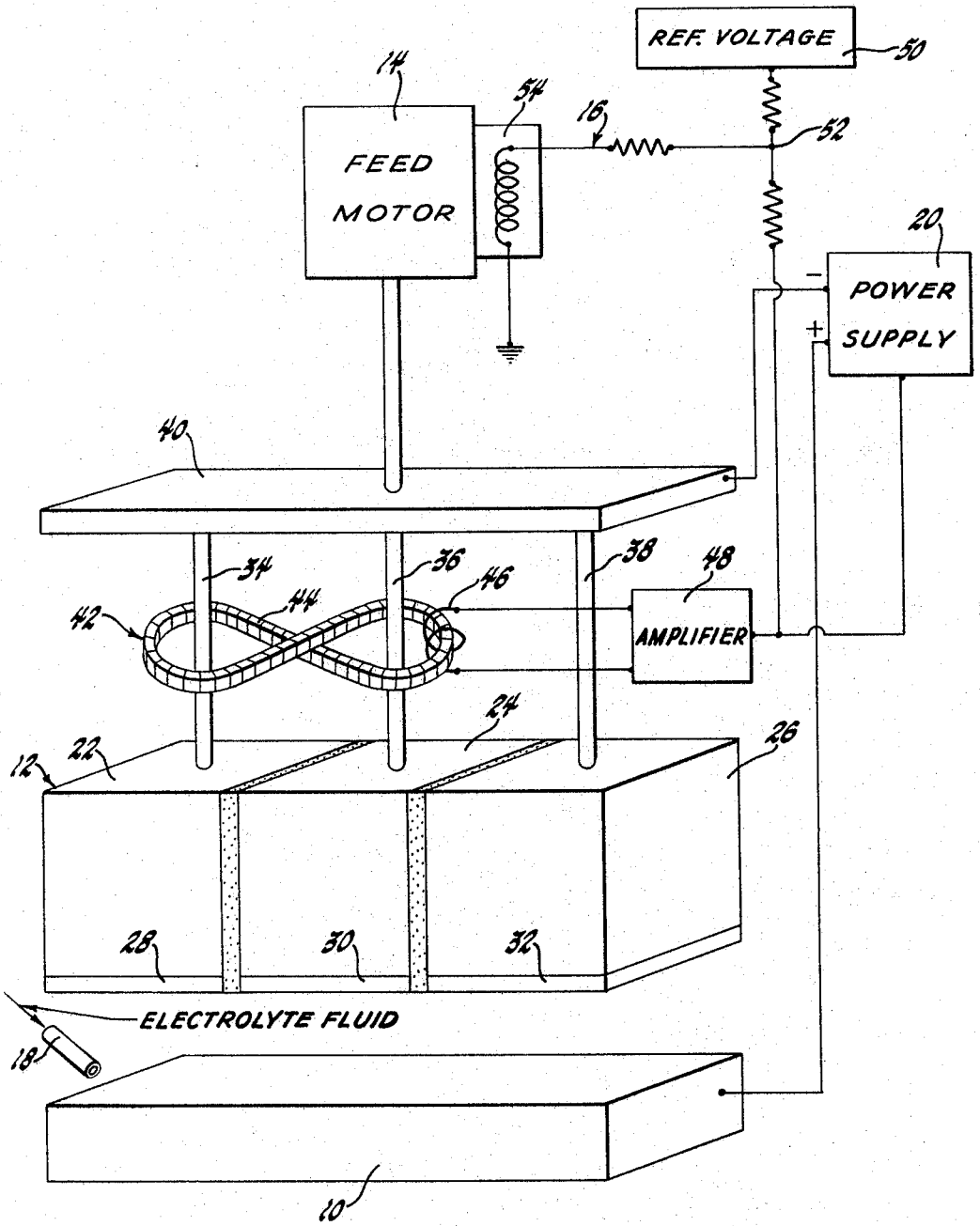

Martin Woods, Warren, Mich., assignor to General Motors Corporation, Detroit, Mich., a corporation of Delaware
Filed Dec. 3, 1962, Ser. No. 241,821
5 Claims. (Cl. 204—143)

This invention relates to method and controls for performing, although not exclusively, the electrical stock removal process.

Very often when complex shapes are being machined by an electrical stock removal process, e.g., electrochemical machining, the cutting tool electrode becomes too close at one point to the workpiece electrode. This results in a short circuit due to the impedance of the gap being reduced at this point. Stock removal ceases and very often the workpiece electrode is damaged at this point. The conventional gap spacing control system only senses average gap conditions and therefore is unaware that a short circuit exists. Accordingly, novel method and controls are proposed for performing the electrical stock removal process whereby variations in the relative current flow between different points are used for control purposes.

It is a further objective of the invention to provide a novel device that senses current flow through plural conductors by comparing the magnetic field generated by the current flow through each conductor and developing an output corresponding to the difference between the magnetic fields.

The foregoing and other objects and advantages of the invention will become apparent from the following description and the accompanying drawing in which the single figure shows schematically electrical stock removal apparatus incorporating the principles of the invention.

Considering now the details of the drawing, the numerals 10 and 12 designate a pair of electrodes, which hereinafter will respectively be referred to as the workpiece and the cutting tool. The workpiece 10 and the cutting tool 12 are spaced relative to each other by a feed motor, which may be operated electrically by fluid pressure or in any other known way, so as to provide a predetermined machining gap between the workpiece 10 and the cutting tool 12. As will become apparent, the gap spacing is determined by a control circuit denoted generally by the numeral 16. An electrolyte fluid is supplied to the gap by a nozzle 18 from some appropriate source. With a D.C. power supply 20 connected across the gap so that the workpiece 10 serves as the anode and the cutting tool 12 as the cathode, current passing therebetween will cause the surface of the workpiece 10 to dissolve in a well known way. The stock removal rate will be according to Faraday's Law, i.e., the amount of stock removed will be directly proportional to the number of amperes transferred through the electrolyte fluid.

It can be appreciated that when large complex surfaces are being machined, the gap at one point may become substantially less than at other points. If this happens, the impedance at this point will reduce and a short circuit will result. The short circuit interrupts the stock removal at this point and can, if allowed to continue, damage the workpiece 10. Accordingly, it is essential that an early warning be provided whenever a short circuit occurs. For this reason the cutting tool 12 is divided into a plurality of segments such as 22, 24, and 26. There may, of course, be many more segments. These segments 22, 24 and 26 are insulated from each other as by an epoxy fill and at their lower ends are formed with conducting electrode surfaces 28, 30, and 32, respectively. The same epoxy fill may be utilized to insulate the conducting surfaces 28, 30, and 32 from each other or any other provision may be made for insuring that a high impedance path for current is formed between each conducting surface. At the upper end, the segments 22, 24, and 26 are respectively connected to current carrying rods 34, 36, and 38. These rods 34, 36, and 38 are joined to a platen 40, which is connected both to the power supply 20 and to the feed motor 14.

By separating the cutting tool 12 into the segments 22, 24, and 26, if a short circuit should occur for any reason between one of the segments 22, 24, or 26 and the workpiece 10, current flow through this one segment will of course increase. To detect this increased current flow, a current sensing device, designated generally by the numeral 42 is employed. The current sensing device 42 employs a tape wound core 44 formed of magnetic material. The core 44 has the depicted figure 8 configuration and forms two loops that surround any two of the current carrying rods such as 34 and 36. A winding 46, which surrounds one loop of the core 44, serves as an output for the current sensing device 42.

Operationally, the current sensing device 42 performs as a transformer with the current carrying rods 34 and 36 serving as primaries, the output winding 46 as a secondary, and the core 44 affording the usual control of the paths of the magnetic fields surrounding the rods 34 and 36. If the machining action is proceeding normally, each of the current carrying rods 34 and 36 will have the same current flow therethrough. Therefore, the flux densities generated by each carrying rod 34 and 36 will be equal and the core 44, due to its configuration, will cause them to cancel each other. Hence, the output winding 46 will have a null output, but if a short circuit occurs at, e.g., some point along conducting electrode surface 28 of the segment 22, the current flow through the rod 34 will increase and accordingly the generated flux density. The flux density balance now will be upset and an output current corresponding to the unbalance will be induced in the output winding 46. Of course, if the short circuit condition occurred in the vicinity of the conducting electrode surface 30 of the segment 24, the current flow through the rod 36 would increase and the resultant current flow in the output winding 46 would reflect this increase.

The configuration of the core 44 eliminates the usual saturation problem because the magnetic fields oppose each other. Therefore, large currents are of no concern.

The short circuit information provided by the output winding 46 can be utilized in various ways. For example, the current flow in the output winding 46 may be transferred through an amplifier 48 and then to the power supply 20 where it can be employed to cut off the power supply 20 by any known arrangement, such as a relay, or this output from the amplifier 48 can be supplied to the control circuit 16 and compared with a reference voltage from a source 50. This reference voltage is variable and corresponds to a certain desired gap spacing. At a summing junction 52, a differential voltage reflecting the algebraic sum of the reference voltage and the output voltage will be developed and may be supplied to a motor controller 54 of any known type, e.g., a force motor, so as to cause the feed motor 14 to withdraw the cutting tool 12 until the desired gap spacing is re-established. Actually, both the power supply 20 may be cut off and the feed motor 14 operated to separate the workpiece 10 and the cutting tool 12 whenever a short circuit is detected, the motor 14 only operated or, only the power supply 20 cut off. The choice will be determined by the application of the process.

It should be noted that the amplifier 48 may not be needed in some installations because of the described transformer action. In other words, by increasing the number of output winding coils, the step-up of the output voltage can be made adequate to be used directly. This step-up is inherently available because the current carrying rods 34 and 36 when performing as primaries offer a low impedance.

Also, it should be kept in mind that the current sensing device 42 has been described in conjunction with electrochemical machining. The current sensing device 42 may also be used with the process known as electrical discharge machining. Moreover, the current sensing device 42 will respond to either alternating or direct current, since the change in the unbalance condition produced by the short circuit causes the output to be developed in the winding 46. In other words, if both of the current carrying rods 34 and 36 were connected to a direct current source, there necessarily would be no transformer action and consequently no output developed in the winding 46 except during the instantaneous change in relative curernt flow occurring whenever a short circuit developed.

From the foregoing, it can be appreciated that a simple, uncomplicated device is provided for detecting short circuits and/or for controlling gap spacing. The device is particularly suited for use with different types of electrical stock removal apparatus and provides an early warning of the presence of a short circuit. This early warning is particularly necessary when expensive and complicated dies are being made, for a short circuit if allowed to continue could render the die worthless.

The invention is to be limited only by the following claims:

1. In electrical stock removal apparatus, the combination of cutting tool and workpiece electrodes spaced apart so as to form a machining gap therebetween, means maneuvering the electrodes relative to each other, means supplying a machining fluid to the gap, the cutting tool electrode having at least two electrically isolated segments and electrically isolated spaced apart current conductors communicating one with each segment, a source of current connected across the gap and arranged so as to supply current to each of the conductors, means controlling the maneuvering means including a current sensing device having a single magnetizable core forming a closed loop that extends around each conductor of a single pair of conductors so that opposing magnetic flux densities are developed therein by the currents flowing in each conductor, and an output winding responsive to the difference in the magnetic flux densities for developing a corresponding output, and means utilizing the output to control the maneuvering means.

2. In electrical stock removal apparatus, the combination of cutting tool and workpiece electrodes spaced apart so as to form a machining gap therebetween, means maneuvering the electrodes relative to each other, means supplying a machining fluid to the gap, the cutting tool electrode having at least two electrically isolated segments and electrically isolated spaced apart current conductors communicating one with each segment, a source of current connected across the gap and arranged so as to supply current to each of the conductors, and means controlling the maneuvering means, the controlling means including a current sensing device having a single figure 8 shaped core surrounding each conductor of a single pair of conductors so that opposing magnetic flux densities are developed therein by the currents flowing in each conductor, and an output winding arranged relative to the core so as to be responsive to any differential between the core so as to be responsive to any differential between the put, and means utilizing the output for controlling the maneuvering means.

3. In electrical stock removal apparatus, the combination of cutting tool and workpiece electrodes spaced apart so as to provide a machining gap therebetween, means maneuvering the electrodes relative to each other, means supplying a machining fluid to the gap, the cutting tool electrode having at least two electrically isolated segments and electrically isolated spaced apart current conductors communicating one with each segment, a source of current connected across the gap and arranged to supply current to each of the conductors, means interrupting the supply of current to the gap, the interrupting means including a current sensing device comprising a single magnetizable core extending around each of a single pair of conductors so that opposing magnetic flux densities are produced in the core by the currents flowing in each conductor, and an output winding responsive to any unbalance of the magnetic flux densities for developing a corresponding output for causing the supply of current to the gap to be interrupted.

4. In electrical stock removal apparatus, the combination of cutting and workpiece electrodes spaced apart so as to provide a machining gap therebetween, means supplying a machining fluid to the gap, the cutting tool electrode having at least two electrically isolated segments and electrically isolated spaced apart current conductors communicating one with each segment, a source of current connected across the gap and arranged so as to supply current to each of the conductors, means maneuvering the electrodes relative to each other, means controlling the maneuvering means including a current sensing device having a single magnetizable core forming a closed loop that extends around each conductor of a single pair of conductors so that opposing magnetic flux densities are produced in the core by current flow in each conductor, an output winding responsive to any unbalance of the magnetic flux densities for developing a corresponding output, and means utilizing the output for causing the maneuvering means to alter the gap spacing.

5. In the process of removing stock from a conductive workpiece by applying electrical energy across a machining fluid-filled gap formed between the workpiece and a conductive cutting tool formed of at least two electrically isolated segments with electrically isolated spaced apart current conductors communicating one with each segment, the steps including the supplying of machining current to each of the conductors, sensing an instantaneous difference between the currents flowing in the conloop that extends around each conductor of a single pair ductors with a single magnetizable core forming a closed of conductors measuring the instantaneous difference in the machining current flows, and utilizing the measured difference for controlling the process.

References Cited
UNITED STATES PATENTS

| | | | |
|---|---|---|---|
| 1,691,125 | 11/1928 | Polydoroff | 336—226 |
| 2,527,881 | 10/1931 | Hartmann | 323—44 |
| 2,709,785 | 5/1955 | Fielden | 323—44 X |
| 2,831,164 | 4/1958 | Johnson | 324—127 |
| 3,058,895 | 10/1962 | Williams | 204—143 |
| 3,085,191 | 4/1963 | Sleeper | 323—51 |
| 3,214,361 | 10/1965 | Williams | 204—724 |

FOREIGN PATENTS
145,104 5/1962 Russia.

JOHN H. MACK, *Primary Examiner.*

R. K. MIHALEK, *Examiner.*